US006982031B1

(12) United States Patent
Rigby

(10) Patent No.: US 6,982,031 B1

(45) Date of Patent: Jan. 3, 2006

(54) ORGANISM KILLER DISPENSER SYSTEM

(76) Inventor: Robert B. Rigby, P.O. Box 83, Nokomis, FL (US) 34274

( * ) Notice: Subject to any disclaimer, the term of this patent is extended or adjusted under 35 U.S.C. 154(b) by 0 days.

(21) Appl. No.: 11/035,598

(22) Filed: Jan. 14, 2005

(51) Int. Cl.
*C02F 1/50* (2006.01)

(52) U.S. Cl. ........................ 210/85; 114/266; 210/170; 210/209; 210/242.1; 210/764

(58) Field of Classification Search .................. 210/85, 210/96.1, 121, 143, 149, 170, 198.1, 209, 210/242.1, 747, 749, 764, 242.2; 114/61.1, 114/264–266

See application file for complete search history.

(56) References Cited

U.S. PATENT DOCUMENTS 3,620,512 A * 11/1971 Muskat et al. ................ 261/92
4,119,541 A * 10/1978 Makaya ................... 210/242.1
4,818,416 A * 4/1989 Eberhardt ................... 210/749
5,089,120 A * 2/1992 Eberhardt ................... 210/170
5,149,443 A * 9/1992 Varnam ...................... 210/739
5,185,085 A * 2/1993 Borgren ...................... 210/747
5,330,639 A * 7/1994 Murphree ................... 210/170
6,022,476 A * 2/2000 Hausin ....................... 210/610
6,778,887 B2 * 8/2004 Britton ........................ 701/21
2001/0035381 A1 * 11/2001 Allen et al. ................. 210/749

* cited by examiner

*Primary Examiner*—Joseph Drodge
(74) *Attorney, Agent, or Firm*—Edward P. Dutkiewicz

(57) ABSTRACT

A manifold assembly is formed of a pipe. The pipe has an open interior. A fluid handling assembly has a plurality of downwardly facing spaced apertures in the manifold. A flexible tube extends downwardly from each aperture. The fluid handling assembly also has a supply of fluid. The fluid is adapted to kill and manage dinoflagelents. A line couples the supply with the tubes for the dispensing of the fluid. At least one water craft with a line couples the central water craft to the manifold. A sensor is provided to determine ambient conditions. The sensor is adapted to analyze the sensed ambient conditions and dispense the fluid at an appropriate rate.

4 Claims, 3 Drawing Sheets

FIG 3
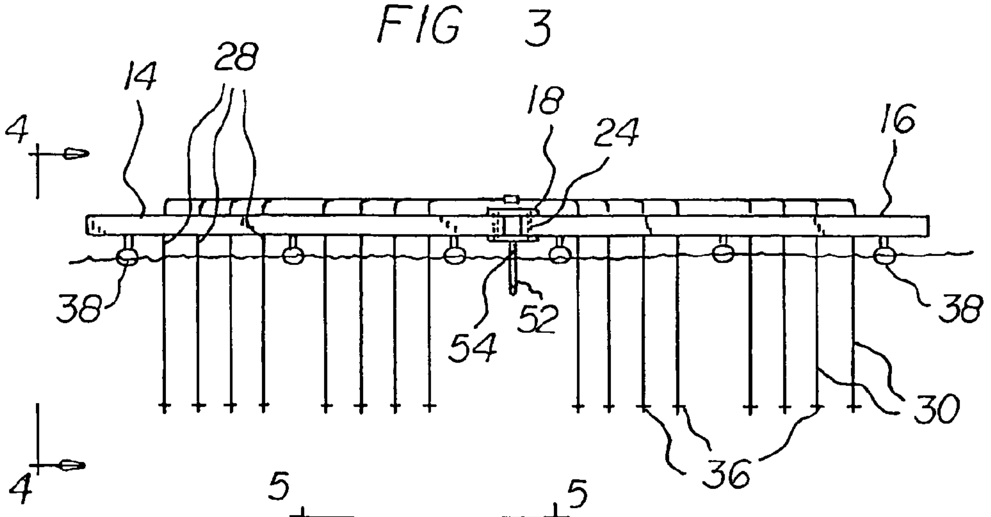
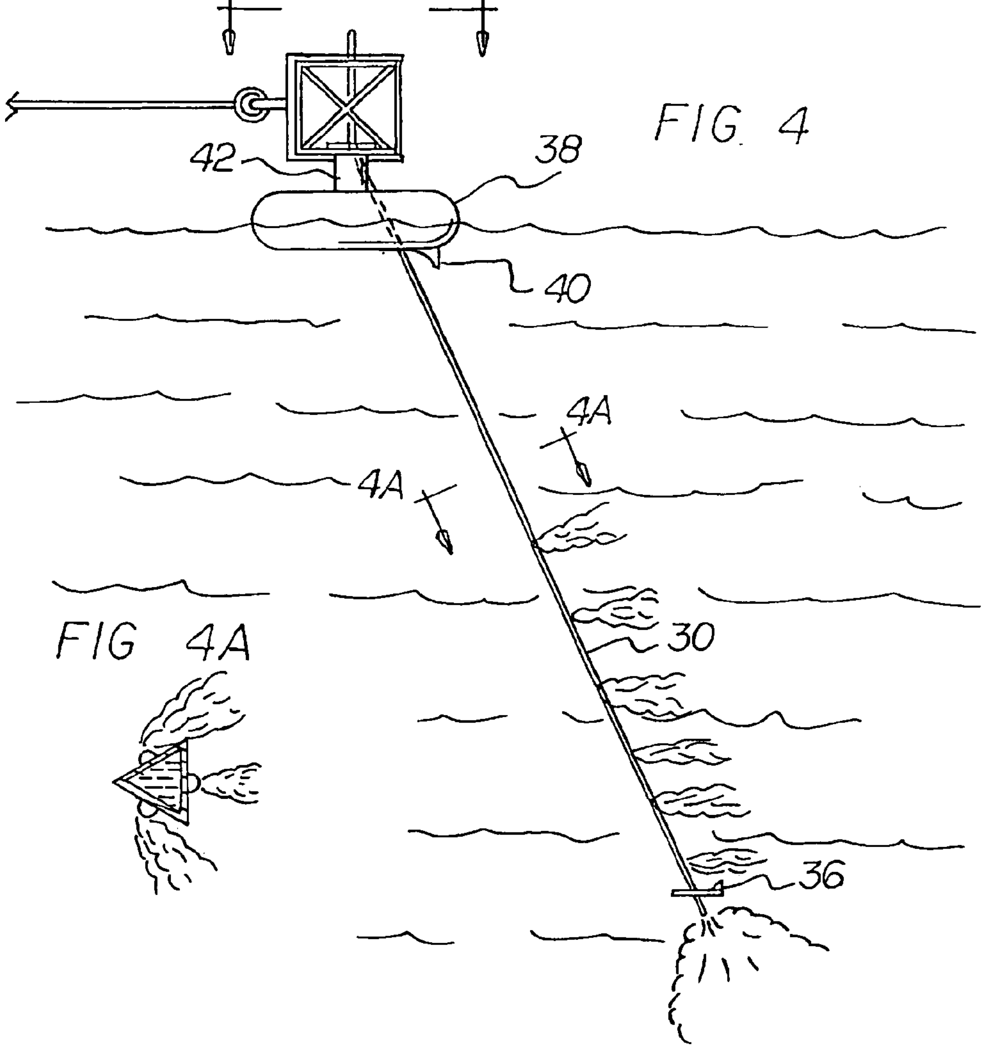
FIG. 4
FIG 4A

ORGANISM KILLER DISPENSER SYSTEM

BACKGROUND OF THE INVENTION

1. Field of the Invention

The present invention relates to an organism killer dispenser system and more particularly pertains to killing and managing red tide and other dinoflagelents.

2. Description of the Prior Art

The use of water treatment devices of known designs and configurations is known in the prior art. More specifically, water treatment devices of known designs and configurations previously devised and utilized for the purpose of treating contaminated water through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,119,541 issued Oct. 10, 1978 to Makaya relates to an arrangement for disposing fluid floating matter. U.S. Pat. No. 4,818,416 issued Apr. 4, 1989 to Eberhardt relates to a method and apparatus for treating bodies of water. U.S. Pat. No. 5,185,085 issued Feb. 9, 1993 to Borgren relates to a water craft and method for treating a body of water. Lastly, U.S. Published Patent Application Number U.S. 2001/0035381 published Nov. 1, 2001 to Allen relates to a containment slick dispersal apparatus and method.

While these devices fulfill their respective, particular objectives and requirements, the aforementioned patents do not describe organism killer dispenser system that allows for killing and managing red tide and other dinoflagelents.

In this respect, the organism killer dispenser system according to the present invention substantially departs from the conventional concepts and designs of the prior art, and in doing so provides an apparatus primarily developed for the purpose of killing and managing red tide and other dinoflagelents.

Therefore, it can be appreciated that there exists a continuing need for a new and improved organism killer dispenser system which can be used for killing and managing red tide and other dinoflagelents. In this regard, the present invention substantially fulfills this need.

SUMMARY OF THE INVENTION

In view of the foregoing disadvantages inherent in the known types of water treatment devices of known designs and configurations now present in the prior art, the present invention provides an improved organism killer dispenser system. As such, the general purpose of the present invention, which will be described subsequently in greater detail, is to provide a new and improved organism killer dispenser system and method which has all the advantages of the prior art and none of the disadvantages.

To attain this, the present invention essentially comprises a manifold assembly. The manifold assembly is formed of a first rectilinear pipe, a second rectilinear pipe and a central coupling component. The central coupling component is between the first and second rectilinear pipes. Each pipe has an open interior end and a closed exterior end. A hinge pin is provided. The hinge couples the interior end of each pipe to the coupling component. In this manner the pipes may pivot between an operative orientation during use and an inoperative orientation during storage and transportation. In an operative orientation the pipes are in a common linear array. In an inoperative orientation the pipes are parallel with respect to each other.

A fluid handling assembly is provided. The fluid handling assembly includes a plurality of downwardly facing spaced apertures in the pipes. The fluid handling assembly includes a flexible tube. The flexible tube extends downwardly from each aperture. The fluid handling assembly also includes a supply of fluid. The fluid is of the type adapted to kill and manage red tide and other dinoflagelents. The fluid handling assembly further includes a line. The line couples the supply with the tubes. In this manner the fluid may be dispensed to contaminated waters. Each flexible tube has a rudder. The rudder holds the lower end of the tube at a submerged location and faces in the direction of motion of the pipes.

A plurality of pontoons is provided next. The pontoons are at spaced apart locations beneath the pipes. The pontoons have a keel. The keel extends downwardly from each pontoon into the water. The pontoons have a rotatable support post. The rotatable support post is provided between each pontoon and its associated pipe to maintain the pontoons facing in the direction of motion of the pipes.

Further provided is a plurality of water crafts. The plurality of water crafts includes a central water craft. The central water craft has a central line. The central line couples the central water craft to the coupling component. The plurality of water crafts also includes two lateral water crafts. The two lateral water crafts have two end lines. The two end lines couple the lateral water crafts to the exterior ends of the pipes. The central water craft supports the supply of fluid to be dispensed during operation and use.

Provided last is a sensor. The sensor extends downwardly from the central component. The sensor has a lower extent. The lower extent extending into the water. The sensor has an upper extent. The upper extent is located above the water. The upper and lower extents of the sensor are adapted to determine the ambient conditions. The ambient conditions include, but are not limited to, air temperature and direction, water temperature and direction, air and water speed, concentration of contaminants, and the like. The sensor is adapted to analyze the sensed ambient conditions and dispense the fluid at an appropriate rate.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved organism killer dispenser system which has all of the advantages of the prior art water treatment devices of known designs and configurations and none of the disadvantages.

It is another object of the present invention to provide a new and improved organism killer dispenser system which may be easily and efficiently manufactured and marketed.

It is further object of the present invention to provide a new and improved organism killer dispenser system which is of durable and reliable constructions.

An even further object of the present invention is to provide a new and improved organism killer dispenser system which is susceptible of a low cost of manufacture with regard to both materials and labor, and which accordingly is then susceptible of low prices of sale, thereby making such organism killer dispenser system economically available.

Even still another object of the present invention is to provide an organism killer dispenser system for killing and managing red tide and other dinoflagelents.

Lastly, it is an object of the present invention to provide a new and improved organism killer dispenser system. A manifold assembly is formed of a pipe. The pipe has an open interior. A fluid handling assembly has a plurality of downwardly facing spaced apertures in the manifold. A flexible tube extends downwardly from each aperture. The fluid handling assembly also has a supply of fluid. The fluid is adapted to kill and manage dinoflagelents. A line couples the supply with the tubes for the dispensing of the fluid. At least one water craft with a line couples the central water craft to the manifold. A sensor is provided to determine ambient conditions. The sensor is adapted to analyze the sensed ambient conditions and dispense the fluid at an appropriate rate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a rear elevational view of the system taken along line 3—3 of FIG. 1.

FIG. 4 is a side elevational view of the system taken along line 4—4 of FIG. 3.

FIG. 4A is a cross sectional view taken along line 4A—4A of FIG. 4.

The same reference numerals refer to the same parts throughout the various Figures.

DESCRIPTION OF THE PREFERRED EMBODIMENT

Figures 1, 2:
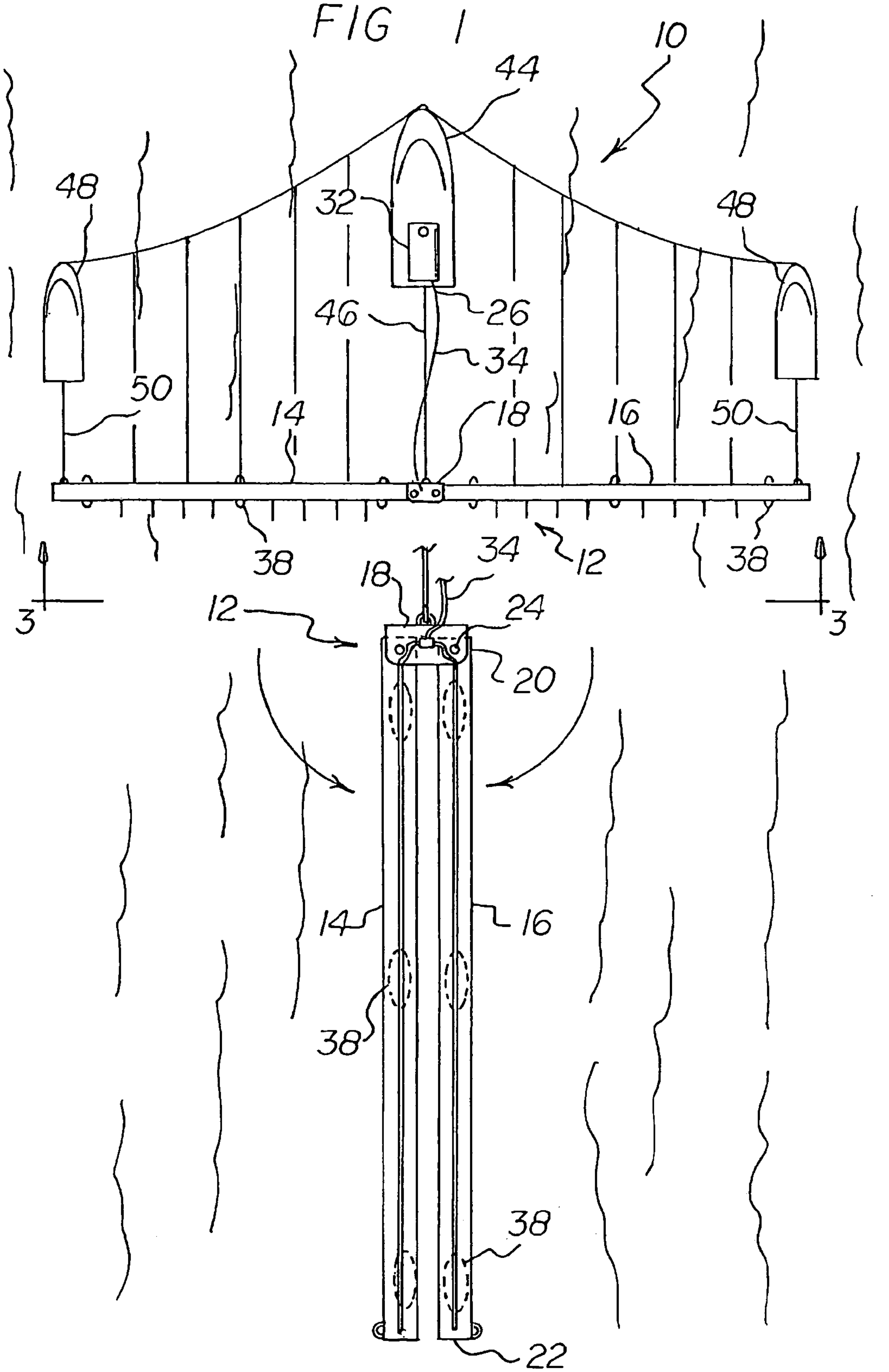
FIG. 1 is a plan view of an organism killer dispenser system constructed in accordance with the principles of the present invention.
FIG. 2 is a plan view of the system shown in FIG. 1 but with the manifold in a folded orientation to facilitate transportation.
Figure 5:
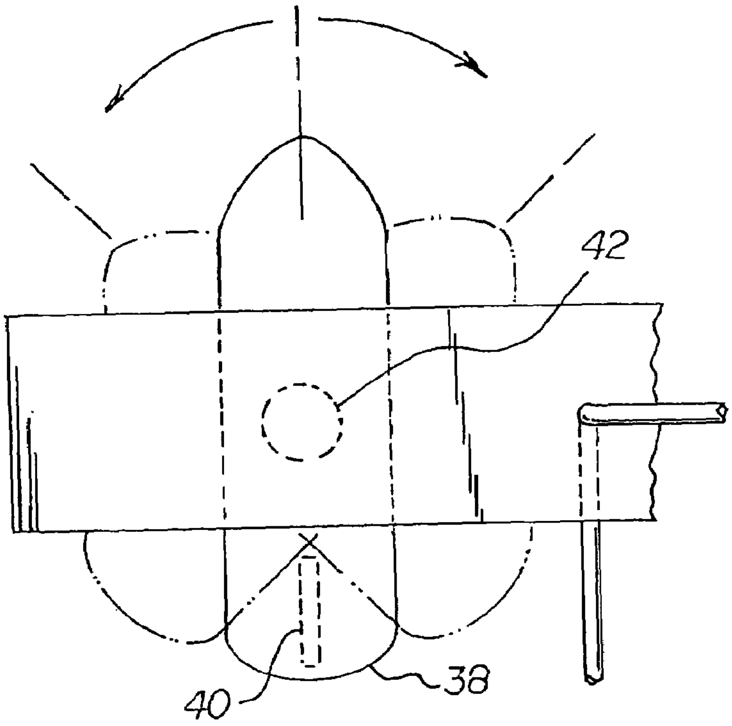
FIG. 5 is a plan view of the system taken along line 5—5 of FIG. 1.

With reference now to the drawings, and in particular to FIG. 1 thereof, the preferred embodiment of the new and improved organism killer dispenser system embodying the principles and concepts of the present invention and generally designated by the reference numeral 10 will be described.

The present invention, the organism killer dispenser system 10 is comprised of a plurality of components. Such components in their broadest context include a manifold assembly, a fluid handling assembly, a plurality of pontoons, at least one water craft and a sensor. Such components are individually configured and correlated with respect to each other so as to attain the desired objective.

First provided is a manifold assembly 12. The manifold assembly is formed of a first rectilinear pipe 14, a second rectilinear pipe 16 and a central coupling component 18. The central coupling component is between the first and second rectilinear pipes. Each pipe has an open interior end 20 and a closed exterior end 22. A hinge pin 24 is provided. The hinge couples the interior end of each pipe to the coupling component. In this manner the pipes may pivot between an operative orientation during use and an inoperative orientation during storage and transportation. In an operative orientation the pipes are in a common linear array. In an inoperative orientation the pipes are parallel with respect to each other.

A fluid handling assembly 26 is provided. The fluid handling assembly includes a plurality of downwardly facing spaced apertures 28 in the pipes. The fluid handling assembly includes a flexible tube 30. The flexible tube extends downwardly from each aperture.

The fluid handling assembly also includes a supply 32 of fluid. The fluid is of the type adapted to kill and manage red tide and other dinoflagelents. The fluid handling assembly further includes a line 34. The line couples the supply with the tubes. In this manner the fluid may be dispensed to contaminated waters. The tube 30 is preferably formed with a triangular cross sectional configuration with the apex facing forward. It is of a length of between 5 feet and 25 feet with dispensing apertures at spaced points along the lower extent of the tube on all three faces for dispensing laterally and rearwardly. Each flexible tube has a rudder 36. The rudder holds the lower end of the tube at a submerged location and faces in the direction of motion of the pipes.

A plurality of pontoons 38 is provided next. The pontoons are at spaced apart locations beneath the pipes. The pontoons have a keel 40. The keel extends downwardly from each pontoon into the water. The pontoons have a rotatable support post 42. The rotatable support post is provided between each pontoon and its associated pipe to maintain the pontoons facing in the direction of motion of the pipes.

Further provided is a plurality of water crafts. The plurality of water crafts includes a central water craft 44. The central water craft has a central line 46. The central line couples the central water craft to the coupling component. The plurality of water crafts also includes two lateral water crafts 48. The two lateral water crafts have two end lines 50 and a front line coupling the front of the central water craft with the fronts of the two lateral water crafts. The two end lines couple the lateral water crafts to the exterior ends of the pipes. The central water craft supports the supply of fluid to be dispensed during operation and use.

Provided last is a sensor. The sensor extends downwardly from the central component. The sensor has a lower extent 52. The lower extent extending into the water. The sensor has an upper extent 54. The upper extent is located above the water. The upper and lower extents of the sensor are adapted to determine the ambient conditions as well as the organism count of the water to be treated. The ambient conditions include, but are not limited to, air temperature and direction, water temperature and direction, air and water speed, concentration of contaminants, and the like as the organism count. The sensor is adapted to analyze the sensed ambient conditions and dispense the fluid at an appropriate rate. The rate of dispensing is controlled by a valving at the reservoir. In an alternate embodiment, the dispensing is controlled by a plurality of valves in the tubes. The preferred technique includes at least one metering valve to dispense an exact amount for the conditions. The fluid dispensed is in a manner to give the greatest coverage to the total volume of receiving water to be treated.

Figure 6:
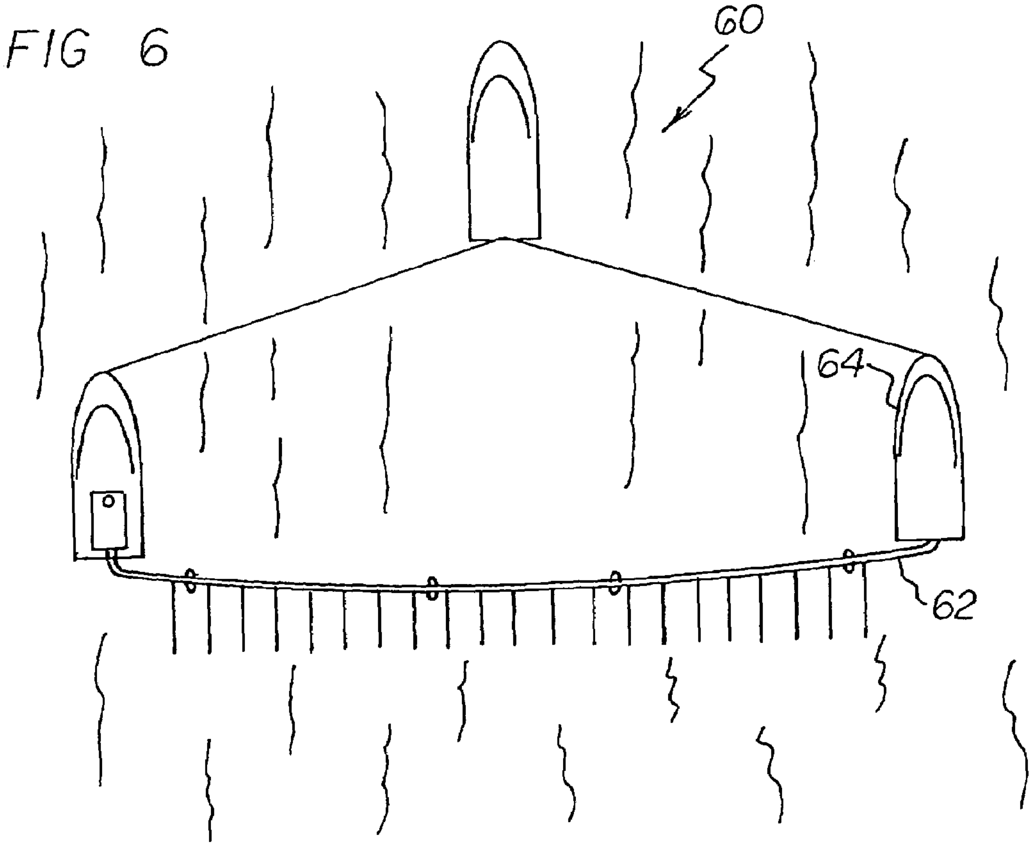
FIG. 6 is a plan view similar to FIG. 1 but illustrating an alternate embodiment of the invention.

As can be seen in FIG. 6, the present invention includes an alternate embodiment of the invention. The manifold assembly of the alternate embodiment is formed of a single pipe 62, preferably with limited flexibility and resilience. Laterally spaced water crafts 64 are coupled to the end of the pipe by lines. The reservoir with the fluid to be dispensed is located in one of the spaced water crafts. A central water craft with lines to the end water crafts are employed to assist in pulling the load.

Preferred compositions including red tide organism killers for being dispensed by the system of the present invention are set forth in co-pending U.S. patent application Ser. No. 11/035,597 filed concurrently herewith.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An organism killer dispenser system comprising:

a manifold assembly formed of a pipe having an open interior;

a fluid handling assembly including a plurality of downwardly facing spaced apertures in the manifold with a flexible tube with a lower end extending downwardly from each aperture, each flexible tube having a rudder to hold the lower end of the tube at a submerged location, the fluid handling assembly also including a supply of fluid adapted to kill and manage dinoflagelents with a line coupling the supply with the tubes for the dispensing of the fluid;

a plurality of pontoons at spaced apart locations beneath the manifold;

at least one water craft with a line coupling the central water craft to the manifold; and a sensor to determine the ambient conditions, for use in analyzing the sensed ambient conditions and then dispensing the fluid at an appropriate rate.

2. The system as set forth in claim 1 wherein the manifold assembly is formed of a first rectilinear pipe and a second rectilinear pipe and a central coupling component there between, each pipe having an open interior end and a closed exterior end with a hinge pin coupling the interior end of each pipe to the coupling component for pivoting the pipes between an operative orientation during use with the pipes in a common linear array and an inoperative orientation during storage and transportation with the pipes parallel with respect to each other.

3. The system as set forth in claim 1 wherein the manifold assembly is formed of a single pipe with laterally spaced water crafts coupled to the end of the pipe.

4. An organism killer dispenser system for killing and managing red tide and other dinoflagelents including gymnodinium breve, karenia brevis, ptychodiscus, pfiesteria piscicida and the like comprising, in combination:

a manifold assembly formed of a first rectilinear pipe and a second rectilinear pipe and a central coupling component there between, each pipe having an open interior end and a closed exterior end with a hinge pin coupling the interior end of each pipe to the coupling component for pivoting the pipes between an operative orientation during use with the pipes in a common linear array and an inoperative orientation during storage and transportation with the pipes parallel with respect to each other;

a fluid handling assembly including a plurality of downwardly facing spaced apertures in the pipes with a flexible tube extending downwardly from each aperture, the fluid handling assembly also including a supply of fluid of the type adapted to kill and manage red tide and other dinoflagelents with a line coupling the supply with the tubes for the dispensing of the fluid to contaminated waters, each flexible tube having a rudder to hold the lower end of the tube at a submerged location and facing in the direction of motion of the pipes;

a plurality of pontoons at spaced apart locations beneath the pipes with a keel extending downwardly from each pontoon into the water and a rotatable support post between each pontoon and its associated pipe to maintain the pontoons facing in the direction of motion of the pipes;

a plurality of water crafts including a central water craft with a central line coupling the central water craft to the coupling component and two lateral water crafts with two end lines coupling the lateral water crafts to the exterior ends of the pipes, the central water craft supporting the supply of fluid to be dispensed during operation and use; and a sensor extending downwardly from the central component with a lower extent extending into the water and an upper extent located above the water, the upper and lower extents of the sensor adapted to determine the ambient conditions including, but not limited to, air temperature and direction, water temperature and direction, air and water speed, concentration of contaminants, and the like, for use in analyzing the sensed ambient conditions and then dispensing the fluid at an appropriate rate.

* * * * *